(12) United States Patent
Xiang et al.

(10) Patent No.: US 11,344,117 B2
(45) Date of Patent: *May 31, 2022

(54) ELECTRIC SHELF

(71) Applicant: Loctek Inc., Livermore, CA (US)

(72) Inventors: Lehong Xiang, Ningbo (CN); Tao Lin, Ningbo (CN); Songli Wang, Ningbo (CN)

(73) Assignee: Loctek Inc., Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/932,359

(22) Filed: Jul. 17, 2020

(65) Prior Publication Data

US 2020/0345135 A1 Nov. 5, 2020

Related U.S. Application Data

(63) Continuation of application No. 16/402,629, filed on May 3, 2019, now Pat. No. 10,729,238, which is a
(Continued)

(30) Foreign Application Priority Data

May 14, 2017 (CN) .......................... 201710337271.X

(51) Int. Cl.
*A47B 57/06* (2006.01)
*A47B 95/00* (2006.01)
(Continued)

(52) U.S. Cl.
CPC .............. *A47B 57/06* (2013.01); *A47B 51/00* (2013.01); *A47B 95/008* (2013.01); *A47B 96/14* (2013.01);
(Continued)

(58) Field of Classification Search
CPC .................. A47B 57/06; A47B 95/008; A47B 2200/0056; A47B 2200/0035;
(Continued)

(56) References Cited

U.S. PATENT DOCUMENTS

| 682,517 A * | 9/1901 | Bahnemann | A47F 3/08 |
| | | | 211/121 |
| 2,875,012 A * | 2/1959 | Riley | A47B 51/00 |
| | | | 312/312 |

(Continued)

FOREIGN PATENT DOCUMENTS

| CN | 2631317 Y | 8/2004 |
| CN | 2812691 Y | 9/2006 |

(Continued)

OTHER PUBLICATIONS

Internation Search Report of PCT/CN2016/102925, dated Jun. 12, 2017.
Office Action of U.S. Appl. No. 15/695,009 dated May 22, 2018.

*Primary Examiner* — Jennifer E. Novosad
(74) *Attorney, Agent, or Firm* — W&KIP

(57) ABSTRACT

An electric shelf which has at least one column to be installed on a wall, a slidable component arranged on the column to slide along the column vertically, at least one layer of shelf board component connected to the slidable component to move simultaneously with the slidable component, and a linear driving device connected to the slidable component and the column to actuate the slidable component to move relative to the column. Advantages of the present disclosure compared to prior arts include a simpler structure and less space occupied by the shelf board component.

20 Claims, 14 Drawing Sheets

Related U.S. Application Data continuation of application No. 15/695,009, filed on Sep. 5, 2017, now Pat. No. 10,334,948, which is a continuation of application No. PCT/CN2017/092380, filed on Jul. 10, 2017.

(51) Int. Cl.
  *A47B 51/00* (2006.01)
  *A47F 5/08* (2006.01)
  *A47F 5/10* (2006.01)
  *A47F 3/08* (2006.01)
  *A47B 96/14* (2006.01)
  *A47F 5/00* (2006.01)
  *A47B 96/02* (2006.01)

(52) U.S. Cl.
  CPC .............. *A47F 3/08* (2013.01); *A47F 5/0081* (2013.01); *A47F 5/08* (2013.01); *A47F 5/103* (2013.01); *A47B 96/021* (2013.01); *A47B 96/028* (2013.01); *A47B 2200/0056* (2013.01)

(58) Field of Classification Search
  CPC .... A47B 2200/0062; A47B 2200/0061; A47B 51/00; A47B 96/14; A47B 96/1433; A47B 96/067; A47B 47/022; A47B 96/027; A47B 96/028; A47F 5/08; A47F 5/103; A47F 5/10; A47F 5/0043; A47F 5/0081; A47F 3/06; A47F 3/08
  USPC ....... 211/90.02, 103, 94.01, 1.51, 1.55, 1.57, 211/121; 108/20, 108, 42, 48, 147.11, 108/144.11; 312/312, 306, 309.5, 319.8; 248/327, 295.11, 241, 244, 246
  See application file for complete search history.

(56) References Cited

U.S. PATENT DOCUMENTS

| | | | | |
|---|---|---|---|---|
| 3,187,880 | A * | 6/1965 | Frater | B65G 17/18 198/798 |
| 3,313,376 | A * | 4/1967 | Holland, Sr. | B66B 9/022 187/241 |
| 3,924,710 | A * | 12/1975 | Shohet | B66B 9/022 187/270 |
| 4,056,196 | A * | 11/1977 | Brauning | A47B 57/54 211/207 |
| 4,070,072 | A * | 1/1978 | Skaller | B65G 1/07 108/136 |
| 4,329,928 | A * | 5/1982 | Shaw | A47B 51/00 108/106 |
| 4,619,208 | A * | 10/1986 | Kurrasch | A47B 9/12 108/106 |
| 4,651,652 | A * | 3/1987 | Wyckoff | A47B 9/12 108/147 |
| 4,667,605 | A * | 5/1987 | Bastian | A47B 9/20 108/106 |
| 4,735,467 | A * | 4/1988 | Wolters | A47B 21/0073 248/694 |
| 4,969,403 | A * | 11/1990 | Schwartz | A47B 5/00 108/147 |
| 4,987,835 | A * | 1/1991 | Schwartz | A47B 57/30 108/147 |
| 5,031,085 | A * | 7/1991 | Rustin | F21V 21/36 362/401 |
| 5,086,935 | A * | 2/1992 | Gallagher | A47F 5/0807 211/103 |
| 5,143,181 | A * | 9/1992 | Bixby | B66B 9/16 182/103 |
| 5,167,302 | A * | 12/1992 | Kinoshita | B62B 3/02 108/136 |
| 5,183,162 | A * | 2/1993 | Ritzenthaler | B62H 3/12 211/1.57 |
| 5,199,778 | A * | 4/1993 | Aoki | A47B 57/32 312/408 |
| 5,211,296 | A * | 5/1993 | D'Heygere | B65G 1/026 211/1.57 |
| 5,249,858 | A * | 10/1993 | Nusser | A47B 46/005 312/248 |
| 5,373,793 | A * | 12/1994 | Crossman | A47B 9/04 108/42 |
| 5,626,328 | A * | 5/1997 | Schneider | A61G 7/018 254/98 |
| 5,715,759 | A * | 2/1998 | Lee | A47B 9/12 108/147 |
| 5,738,225 | A * | 4/1998 | Kim | A47B 63/067 211/1.57 |
| 5,799,588 | A * | 9/1998 | Engel | A47B 57/06 108/108 |
| 5,809,908 | A * | 9/1998 | Catta | A47B 9/12 108/147 |
| 5,950,846 | A * | 9/1999 | Duane | A47B 47/022 211/175 |
| 6,209,405 | B1 * | 4/2001 | Milsem | A47B 46/00 74/89.21 |
| 6,676,233 | B1 * | 1/2004 | Evans | B66B 9/02 312/247 |
| 6,729,478 | B1 * | 5/2004 | Boers | B62H 3/12 211/18 |
| 6,899,347 | B2 * | 5/2005 | Neal | B62B 1/10 108/36 |
| 6,976,598 | B2 * | 12/2005 | Engel | A47B 57/06 211/175 |
| 7,281,607 | B1 * | 10/2007 | Kiraly | A01M 31/02 182/102 |
| 7,690,317 | B2 * | 4/2010 | Beck | F16M 11/10 108/143 |
| 7,874,436 | B2 * | 1/2011 | Hought | A47B 81/00 211/85.11 |
| 7,942,277 | B1 * | 5/2011 | Flynn | B68C 1/002 211/85.11 |
| 8,152,258 | B2 * | 4/2012 | Kang | F25D 25/02 312/408 |
| 8,226,184 | B2 * | 7/2012 | Kang | F25D 25/02 312/408 |
| 8,556,093 | B2 * | 10/2013 | Davis | A47F 5/01 211/187 |
| 8,622,488 | B1 * | 1/2014 | Kilby | A47B 51/00 312/247 |
| 8,939,296 | B2 * | 1/2015 | Weyler | A47B 46/005 211/1.51 |
| 9,113,705 | B1 * | 8/2015 | Jacob | F16B 1/00 |
| 9,593,481 | B2 * | 3/2017 | Gosling | E04B 2/7407 |
| 10,334,948 | B2 * | 7/2019 | Xiang | A47B 95/00 |
| 10,729,238 | B2 * | 8/2020 | Xiang | A47F 5/0081 |
| 2001/0037751 | A1 * | 11/2001 | Agee | A47B 9/12 108/147 |
| 2002/0124777 | A1 * | 9/2002 | Lag | A47B 9/06 108/20 |
| 2005/0045077 | A1 * | 3/2005 | Bober | B66F 9/02 108/147 |
| 2006/0104756 | A1 * | 5/2006 | Kim | A47B 51/00 414/288 |
| 2006/0226092 | A1 * | 10/2006 | Krohn | A47F 3/11 211/1.51 |
| 2008/0203041 | A1 * | 8/2008 | Lim | F25D 25/02 211/119.003 |
| 2008/0246382 | A1 * | 10/2008 | Kang | F25D 25/02 312/408 |
| 2010/0089845 | A1 * | 4/2010 | Fassler | B66F 7/04 211/1.57 |
| 2010/0171402 | A1 * | 7/2010 | Yoon | A47B 96/028 312/408 |
| 2013/0220949 | A1 * | 8/2013 | Sargent | A01G 20/47 211/4 |
| 2014/0123881 | A1 * | 5/2014 | Quiring | B66F 7/0666 108/20 |
| 2015/0096950 | A1 * | 4/2015 | Engel | A47B 46/00 211/90.02 |

(56) References Cited

U.S. PATENT DOCUMENTS

2017/0233987 A1\* 8/2017 Son .................. A47B 77/04 4/695
2017/0341924 A1\* 11/2017 DeWitt ............ A47B 81/00
2018/0084906 A1\* 3/2018 Finch, Jr. ............ B66F 7/02

FOREIGN PATENT DOCUMENTS

| CN | 201088284 Y | 7/2008 |
| CN | 201958212 U | 9/2011 |
| CN | 203168475 U | 9/2013 |
| JP | 2006000581 A | 1/2006 |

\* cited by examiner

ELECTRIC SHELF

CROSS-REFERENCE TO RELATED APPLICATIONS

This application is a continuation of U.S. utility patent application Ser. No. 16/402,629 with filing date May 3, 2019, now pending, which is a continuation of U.S. utility patent application Ser. No. 15/695,009 with filing date Sep. 5, 2017, now granted, which is a continuation of International Patent Application No. PCT/CN2017/092380 with a filing date of Jul. 10, 2017, designating the United States, now expired, and further claims priority to Chinese Patent Application No. 201710337271.X with a filing date of May 14, 2017. The content of the aforementioned applications, including any intervening amendments thereto, are incorporated herein by reference.

TECHNICAL FIELD

The present disclosure relates to a shelf, and more particularly, to an electric shelf.

BACKGROUND OF THE PRESENT INVENTION

Daily necessities at home are growing in numbers due the continuous improvement of living standards. Sorting out the items could be a serious trouble in many situations since scattering the items about will further exaggerate the trouble. Therefore, shelves are being more widely used in daily life these days. A shelf to place and sort the daily necessities would be needed for the increasing types of the items. It would be helpful to provide a flexibly and simply designed shelf to facilitate sorting of daily necessities. Such a shelf would be especially beneficial for having daily necessities ready to find and access.

Fixed shelves existing in markets are generally divided into an on-site type, a wall-hanging type and a ceiling type. Since the shelves are fixed, it is difficult to satisfy the requirement for ease of access and the requirement for reducing occupied space simultaneously. In prior arts, a type of shelves would be fixed to a wall. Mounting the shelf at a lower height enables easier access to the placed items for users, but requires more usable home space. Mounting the shelf at a higher height allows the user to pass under without occupying usable home space, but presents difficulty in accessing placed items. A pulley and a motor can be employed to achieve rising and declining of a ceiling type shelf. When a user needs to access an item, he or she can lower the shelf. The user can raise the shelf and pass under the shelf in order to save home space. This configuration enables rising and declining of the shelf by fixing three or four positions on the shelf with ropes. Instability during the rising or declining of the shelf could cause the shelf to waggle and results in insecurity such as collision or even dropping of items on the shelf. The ceiling type shelf also incurs difficulties during installation. A user is usually unable to install the shelf alone. Costs for installing the shelf are likely to increase.

SUMMARY OF PRESENT INVENTION

The objective of the present disclosure is to solve some of the problems of the prior arts by providing an electric shelf with a more stable structure which is safer to user and simpler to install.

The present disclosure discloses an electric shelf comprising at least one column to be installed on a wall, a slidable component arranged on the column to slide along the column vertically, at least one layer of shelf board component connected to the slidable component to move simultaneously with the slidable component, and a linear driving device connected to the slidable component and the column to actuate the slidable component to move relative to the column. One advantage of the embodiment is the simpler structure provided. By mounting the electric shelf onto the wall with mounting boards on the two sides of the column and actuating the shelf board component on the column with the linear driving device, the space between a bottom of the shelf board component and the floor allows a user to pass through when he or she raises the shelf board component after lowering it to access an item. Such a configuration prevents the shelf board component from occupying effective space of the user. The shelf board component is raised or lowered through a motor which enhances user experience by saving time and labor. Having the shelf board component move along a fixed column is safer than using the hanging approach for raising or lowering the shelf board component.

In some embodiments, the column comprises one or more mounting boards for mounting onto the wall.

In some embodiments, the column comprises two mounting boards arranged on an upper part and a low part of the column, respectively.

In some embodiments, the column is an interior tube fixed to the wall, and the slidable component is an exterior tube mounted outside the interior tube.

In some embodiments, the column is an exterior tube fixed to the wall, and the slidable component is an interior tube mounted inside the exterior tube. The shelf board component extends in the horizontal direction after being installed. The shelf board component is vertical to the linear driving device. Therefore, the linear driving device is subject to a force in the horizontal direction induced by the shelf board component. The force is a friction force induced by movement of the linear driving device. The force is applied to the exterior tube when the exterior tube is connected to the shelf board component, so the friction force in the horizontal direction is reduced.

In some embodiments, the interior tube is hollow, a driving end of the linear driving device is arranged within the interior tube, a rail groove is arranged vertically on the interior tube, and the driving end of the linear driving device is connected to the exterior tube through the rail groove. The appearance of the columns would be more concise and artistic using this configuration.

In some embodiments, a sliding rail is arranged vertically on the column, and the slidable component is a slider in connection with the sliding rail to slide along the sliding rail.

In some embodiments, each shelf board component comprises a frame, a board body and a reinforcing bar arranged parallel with the frame and connected to the slidable component, the slidable component is connected to the frame at a side of the frame which is adjacent to the column, at least two groups of connecting bars are arranged between the reinforcing bar and the frame, each group of connecting bars comprises two connecting bars, and each connecting bar is connected to the reinforcing bar on one end and to the frame on the other end. This configuration improves weight-bearing capability of the shelf board component.

In some embodiments, the electric shelf comprises two layers of shelf board components, and the distance between the two shelf board components is larger than the distance between the two reinforcing bars of the two shelf board components.

In some embodiments, each shelf board component comprises a frame and a board body, a frame connector is arranged between the frame and the exterior tube, the frame connector encircles the exterior tube near a central section of the frame connector, and the two ends of the frame connector are fixed to the frame. This configuration is more stable and artistic.

In some embodiments, each shelf board component further comprises a reinforcing bar arranged parallel with the frame, a reinforcing bar connector is arranged between the reinforcing bar and the exterior tube, the reinforcing bar connector encircles the exterior tube near a central section of the reinforcing bar connector, and the two ends of the reinforcing bar connector are fixed to the reinforcing bar.

In some embodiments, the linear driving device comprises a motor, a transmission component, a screw rod and a screw rod nut, the screw rod nut is connected to the slidable component or connected to the shelf board component as the slidable component.

In some embodiments, the column is hollow, the screw rod and the screw rod nut of the linear driving device are arranged within the column, a rail groove is arranged vertically on the column, the slidable component is a guide sleeve mounted outside the rail groove, and the screw rod nut is connected to the guide sleeve through the rail groove.

In some embodiments, a limiter is provided between a top end of the screw rod and the column to avoid drift of the screw rod. The limiter is to prevent waggling of the screw rod.

In some embodiments, the linear driving device comprises a motor, a transmission component, a motor connector, a wheel gear and a rack gear, the wheel gear is engaged with the rack gear, the motor is connected to the wheel gear through the transmission component, the motor actuates the wheel gear to rotate on the rack gear such that the motor moves vertically along the rack gear, the motor is connected to the slidable component through the motor connector, and the rack gear is fixed to and parallel with the column.

In some embodiments, the linear driving device comprises a motor, a fixed pulley, a moving pulley and a wire, the fixing pulley is fixed to the column, the moving pulley is connected to the slidable component, the wire is connected to the fixed pulley, the moving pulley, and the motor, and the motor actuates the moving pulley to move vertically by pulling the wire.

In some embodiments, the linear driving device further comprises a wire coiler connected to the wire.

In some embodiments, the linear driving device comprises a controllable magnetic guide rail, a magnetic core and an insulating slidable component, the controllable magnetic guide rail is fixed to and parallel with the column, the magnetic core is connected to the slidable component, and the magnetic core actuates the slidable component to move along the controllable magnetic guide rail.

In some embodiments, the shelf board component comprises two parts including a connecting part adjacent to the column and an extending part away from the column, and the connecting part is detachably or rotatably connected to the extending part. This configuration can reduce the width of the shelf board component and the package size of the electric shelf, thereby decreasing transportation costs.

DESCRIPTION OF THE DRAWINGS

The present disclosure is illustrated by way of example and not limitation in the figures of the accompanying drawing, in which.

DETAILED DESCRIPTION OF PREFERRED EMBODIMENTS

Figure 1:
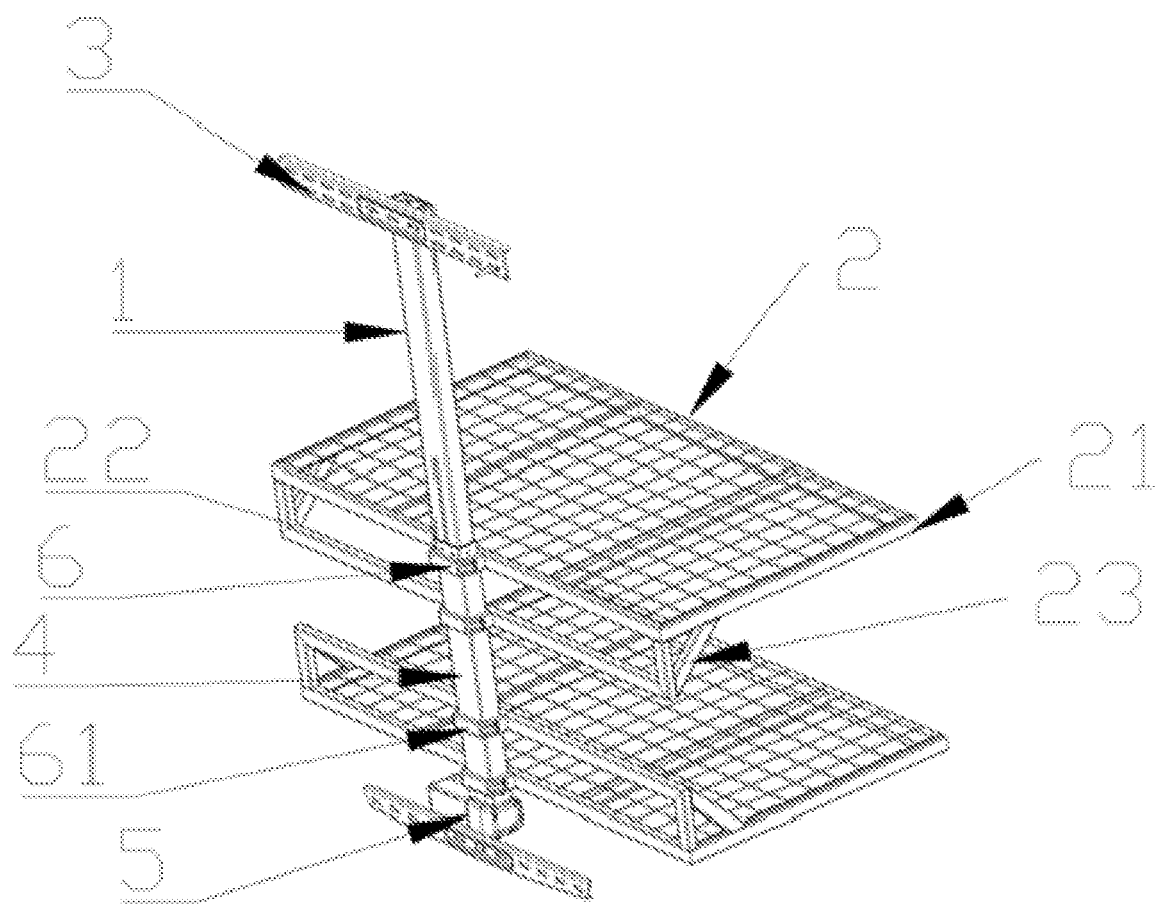
FIG. 1 illustrates the schematic structure of an electric shelf according to an embodiment of the present disclosure.
Figure 2:
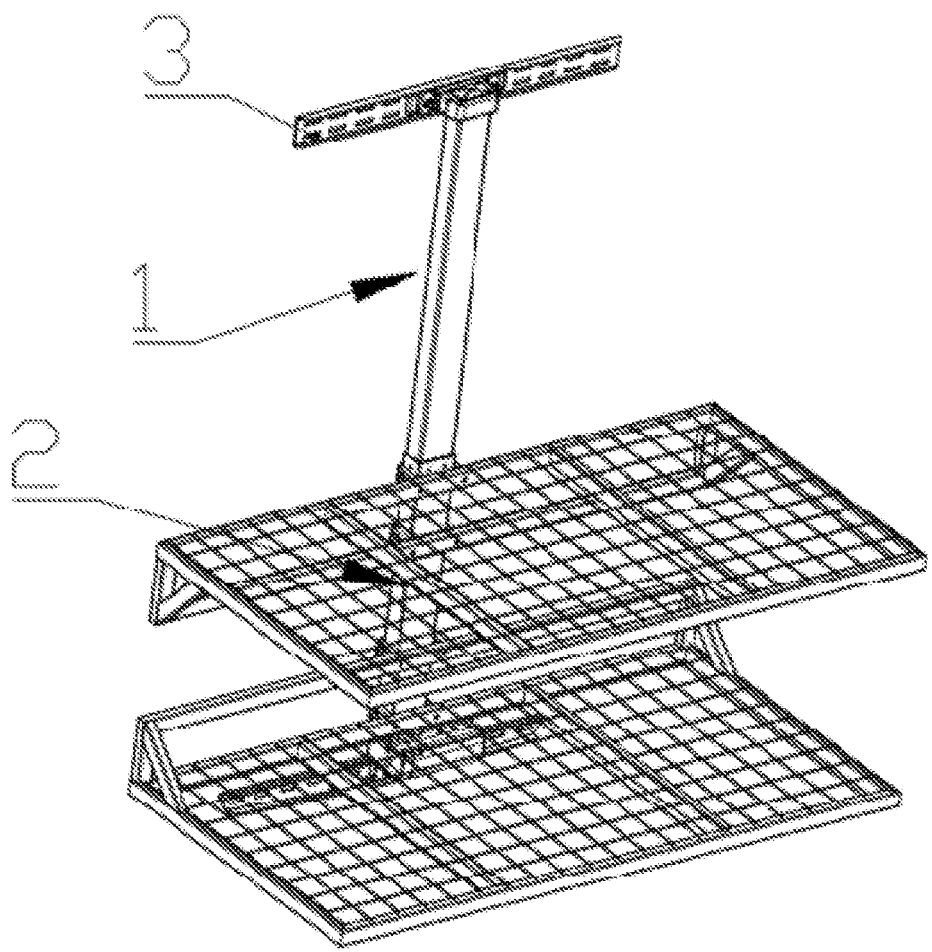
FIG. 2 illustrates another perspective of the structure of an electric shelf according to an embodiment of the present disclosure.

As shown in FIG. 1-2, the electric shelf of the present disclosure comprises at least one column 1 to be installed on a wall, a slidable component arranged on the column 1 to slide along the column 1 vertically relative to the column 1, at least one layer of shelf board component 2 connected to the slidable component to move simultaneously with the slidable component 2, and a linear driving device 7 connected to the slidable component and the column 1 to actuate the slidable component to move relative to the column 1.

The column 1 can be mounted directly to the wall. The column 1 comprises one or more mounting boards 3 for mounting onto the wall. In some embodiments, the column 1 comprises at least two mounting boards arranged on an upper part and a low part of the column 1, respectively. A plurality of mounting holes are provided on each mounting board 3. The column 1 can be mounted onto the wall by the mounting boards 3.

In some embodiments, the column 1 comprises a pothook 12 on an upper part. Two mounting boards 3 are fixed to an upper part and a lower part of the wall, respectively. The upper part of the column 1 is connected to the upper mounting board 3 by the pothook 12. The pothook 12 comprises a hook-shaped upper part and a protruding fixing board on a lower part. A fixing hole 12a is provided on the fixing board. When the upper part of the pothook 12 is attached to the upper mounting board 3, the fixing board on the lower part of the pothook 12 is below the upper mounting board 3. The pothook 12 facilitates mounting of the column 1 by fastening a bolt through the fixing hole 12a to fix the pothook 12 to the mounting board 3 and connecting the mounting board 3 of the lower part of the column 1 to the wall. Deploying the mounting boards 3 provides fixation for the column 1 as well as a gap between the column 1 and the wall such that various approaches to connect the slidable component to the column 1 can be readily applied.

Figure 13:
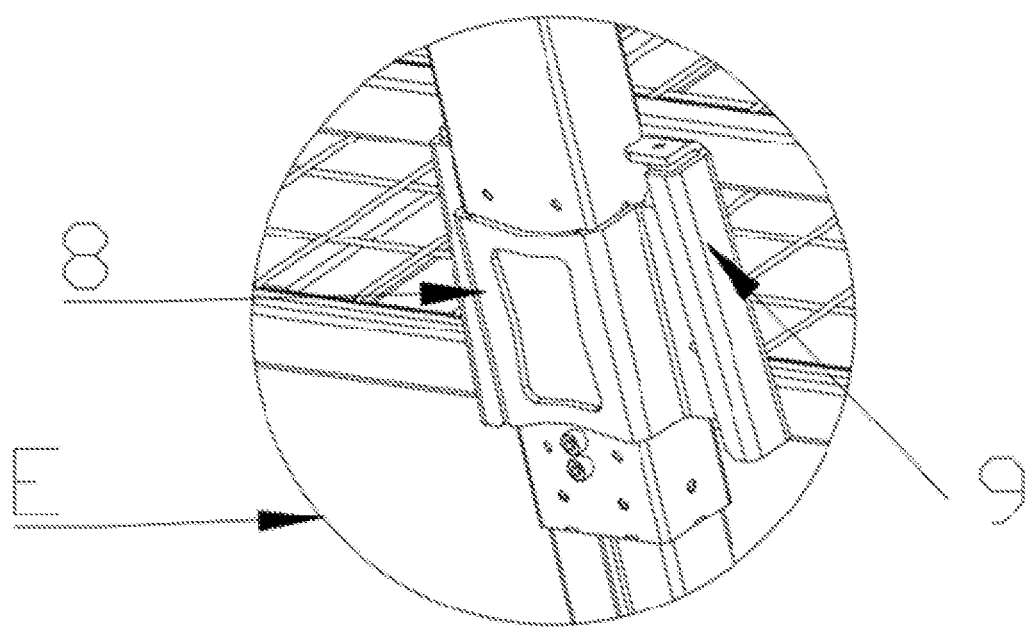
FIG. 13 illustrates an enlarged view of a part D of FIG. 11 according to an embodiment of the present disclosure.
Figure 14:
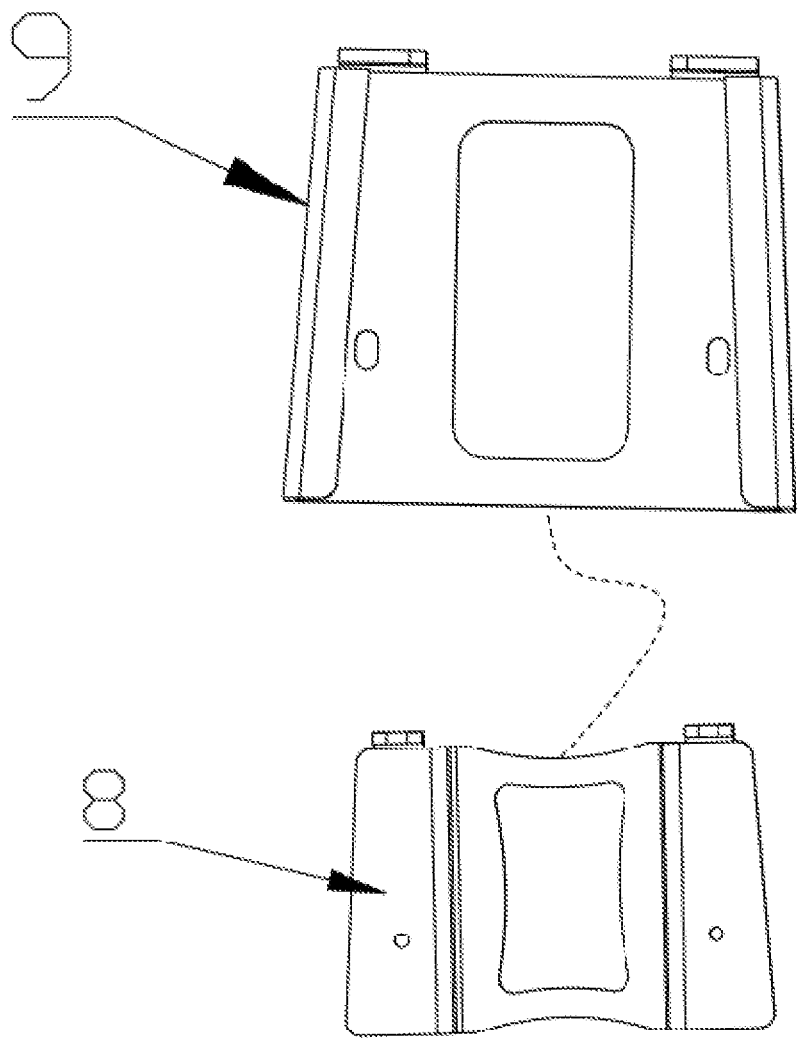
FIG. 14 illustrates the schematic structures of a cap and a cassette according an embodiment of the present disclosure.

The shelf board component 2 is connected to the slidable component in a snapped-in fashion in some embodiments. The shelf board component 2 comprises one of a cap 9 and a cassette 8 on a side adjacent to the column 1, while the slidable component comprises the other of the cassette 8 and the cap 9. The shelf board component 2 is connected to the slidable component by the cassette 8 and the cap 9 in a snapped-in fashion. As shown in FIGS. 13 and 14, the slidable component comprises a cassette 8 and the shelf board component 2 comprises a cap 9 in correspondence with the cassette 8 on a side adjacent to the column 1. The cassette 8 and the cap 9 are shaped as a trapezoid with an upper end being narrower. The cap 9 is aligned with the cassette 8 when mounting the shelf board component 2 on the slidable component. Due to the trapezoidal shape of the cassette 8 and the cap 9, the cap 9 would be limited on the cassette 8 after gravity causes the cap 9 to slide down the cassette 8 to a certain displacement. Bolts are provided additionally to fix the cassette 8 and the cap 9 to strengthen the connection between the shelf board component 2 and the slidable component. The snapped-in fashion of the cassette 8 and the cap 9 facilitates mounting of the shelf board component 2.

The slidable component can be slidably connected to the column by a guide sleeve. In some embodiments, the column 1 is an interior tube fixed to the wall, and the slidable component is an exterior tube mounted outside the interior tube. In some embodiments, the column 1 is an exterior tube fixed to the wall, and the slidable component is an interior tube mounted inside the exterior tube. Sliding movement would be more stable by utilizing the guide sleeve. Since the body of the shelf board component 2 extends in the horizontal direction in its installed state, the shelf board component would be perpendicular to the linear driving device 7. A friction force induced by movement of the linear driving device 7 would be applied to the linear driving device 7 in the horizontal direction. The force will be applied to the exterior tube once the exterior tube is connected with the shelf board component 2. As a result, the horizontal friction force applied to the linear driving device 7 can be reduced. In some embodiments, the interior tube is a hollow structure. The driving end of the linear driving device 7 is arranged within the interior tube. A rail groove 11 is arranged vertically on the interior tube. The driving end of the linear driving device is connected to the exterior tube through the rail groove 11. The configuration with the linear driving device 7 inside the interior tube and the rail groove 11 on the interior tube provides an artistic and concise visual effect for the exterior tube of column 1.

The slidable component can also be slidably connected to the column 1 by a sliding rail. The sliding rail is arranged vertically on the column 1, and the slidable component is a slider in connection with the sliding rail to slide along the sliding rail.

In some embodiments, the electric shelf can have an alternative configuration of its various components. The electric shelf can comprise one or more columns 1. Mounting board 3 can be provided on the two ends of each column 1 for fixing to the wall. A plurality of mounting holes can be provided on the mounting board 3. For better understanding of the reader, the side of the column 1 facing the wall after installation of the column 1 is defined as the back side, and the side of column away from the wall is defined as the front side. The top section of the column is defined as the upper part. The bottom section of the column is defined as the lower part. The column is a hollow structure with a rail groove 11 arranged on the back side. A movable guide sleeve 4 is arranged on the column 1. A linear driving device 7 is arranged within the column 1. The linear driving device 7 is connected to the guide sleeve 4 by the rail groove 11. The linear driving device 7 is also connected to a motor 5 which powers the linear driving device 7 to actuate the guide sleeve 4 within the rail groove 11. Since the linear driving device 7 is arranged within the column 1 and the rail groove 11 is arranged on the back side of the column 1, the electric shelf would benefit from an artistic and concise overall appearance which is competitive. A shelf board component 2 oriented perpendicularly to the column 1 is arranged on the front side of the column 1. The shelf board component 2 is fixed to the guide sleeve 4 through a connector 6. The displacement of the shelf board component 2 relative to the column 1 is in the vertical direction since the shelf board component 2 is installed perpendicularly to the column 1. Therefore, a friction force induce by the movement of the shelf board component 2 would be applied to the linear driving device 7 in the horizontal direction. The guide sleeve 4 would sustain the friction force if it is connected with the shelf board component 2. In the embodiments of the present disclosure, the guide sleeve 4 is arranged on the column 1. The short distance between the guide sleeve 4 and the column 1 suggests a small arm of force which reduces the friction force the linear driving device 7 sustains in the horizontal direction.

In some embodiments, the shelf board component 2 comprises a frame 21 and a board body. The board body can be a grid board or a flat board. The frame 21 is connected to the slidable component at a side of the frame 21 which is adjacent to the column 1. The shelf board component 2 further comprises a reinforcing bar 22 arranged parallel with the frame 21. The reinforcing bar 22 is connected to the slidable component. At least two groups of connecting bars 23 are arranged between the reinforcing bar 22 and the frame 21. Each group of connecting bars 23 comprises at least two connecting bars 23. Each connecting bar 23 is connected to the reinforcing bar 22 on one of its ends, and to the frame 21 on the other of its ends. In an embodiment, the two ends of two connecting bars 23 are both connected to an end point of the reinforcing bar 22, and the two other ends of the two connecting bars 23 are respectively hinged to a side of the frame 21. Three joints are formed which constitute a triangle to provide a more stable structure. The weight-bearing capability of the shelf board component 2 is improved by this structure. A frame connector 6 is provided between the shelf board component 2 and the exterior tube. A reinforcing bar connector 61 is provided between the reinforcing bar 22 and the exterior tube. The frame connector 6 encircles the exterior tube near a central section of the frame connector 6. The reinforcing bar connector 61 encircles the exterior tube near a central section of the reinforcing bar connector 61. The two ends of the frame connector 6 are fixed to the frame 21. The two ends of the reinforcing bar connector 61 are fixed to the reinforcing bar 22.

During usage, two layers of shelf board components 2 are provided to increase the storage capability of the electric shelf. Each shelf board component 2 is connected to a reinforcing bar 22. The distance between the two shelf board components 2 is larger than the distance between the two reinforcing bars 22 of the two shelf board components 2. Such an arrangement ensures larger effective storage space between a pair of shelf board components 2. The connecting bars 23 at the two sides of the frame 21 would also perform as baffles for any items on the shelf board components 2.

Figure 3:
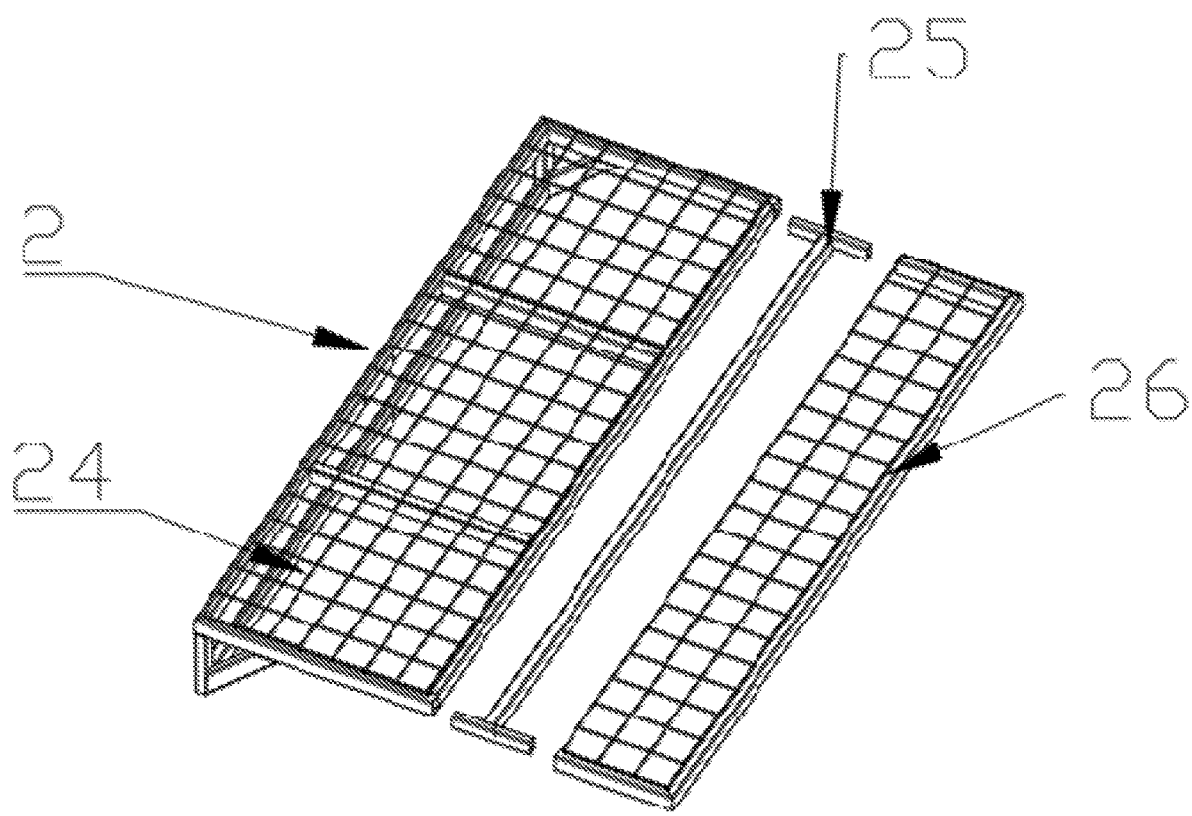
FIG. 3 illustrates the shelf board component of an electric shelf according to an embodiment of the present disclosure.

As shown in FIG. 3, the shelf board component 2 is configured to comprise two parts to reduce both the width of the shelf board component 2 and the package size of the electric. Transportation costs can also be reduced. The two parts include a connecting part 24 adjacent to the column 1 and an extending 26 part away from the column 1. The reinforcing bar 22 and the connecting bar 23 are both arranged on the connecting part 24. The connecting part 24 is detachably or rotatably connected to the extending part 26. In some embodiments, the frame structures of the connecting part 24 and the extending part 26 are hollow. A connecting support 25 is arranged between the connecting part 24 and the extending part 26. A plurality of lugs are provided on the two sides of the connecting support 25. The lugs are inserted into the frame structures of the connecting part 24 and the extending part 26 such that the connecting part 24 is connected to the extending part 26. In some embodiments, the lugs are fixed to the connecting part 24 and the extending part 26 by screws to consolidate the connection between the connecting part 24 and the extending part 26.

The following embodiments pertain to various implementations of the linear driving device 7 of the present disclosure which comprise, but are not limited to, the following embodiments.

Figure 4:
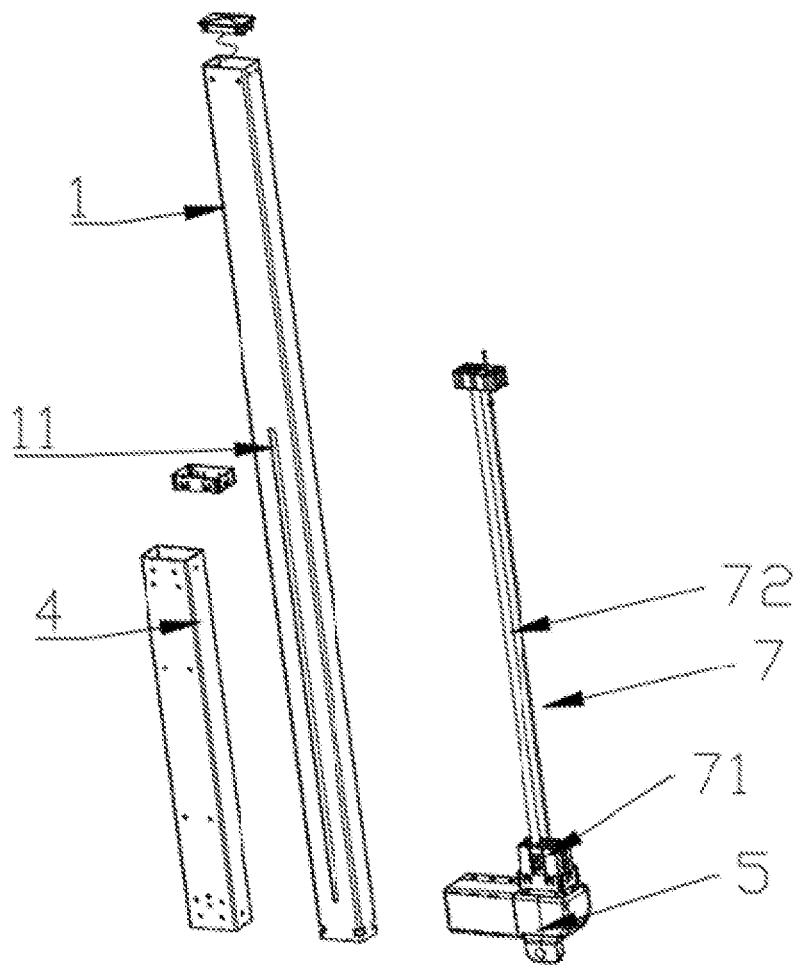
FIG. 4 illustrates the exploded view of the linear driving device of an electric shelf according to the first embodiment of the present disclosure.

In a first embodiment, the linear driving device 7 of the electric shelf as shown in FIG. 4 comprises a motor 5, a screw rod 72, a screw rod transmission component, and a screw rod nut 71. The screw rod 72 is drivably connected to the motor 5. The screw rod nut 71 is fixed to the guide sleeve 4 through the rail groove 11. A friction sheet is provided between the guide sleeve 4 and the column 1. A limiter 73 is provided on top of the column 1. In particular, the limiter 73 is a bearing connected to the top end of the screw rod 72. The bearing is used for vibration absorption and noise absorption. During usage, the axial output torque of a driving shaft of the motor 5 is laterally transmitted to the screw rod 72 by the screw rod transmission component. Then the screw rod nut 71 actuates the guide sleeve 4 to move vertically along the rail groove 11 on the column 1. A limit switch is attached to the motor 5 which is drivably connected to the screw rod nut 71 by a linking shaft. The linking shaft would switch on the limit switch to disconnect the motor 5 in one way when the screw rod nut 71 reaches an end point of its displacement of the screw rod 72.

Figure 5:
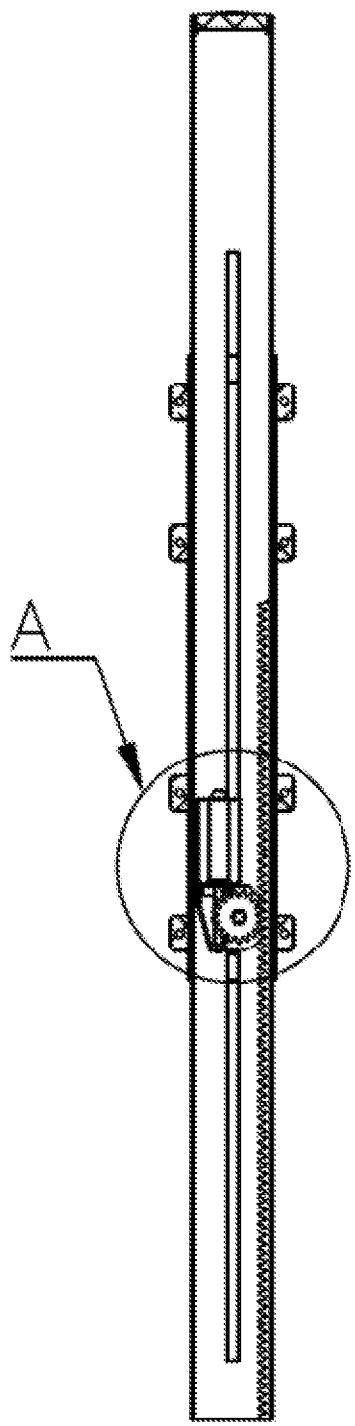
FIG. 5 illustrates a profile of the linear driving device according to the second embodiment of the present disclosure.
Figure 6:
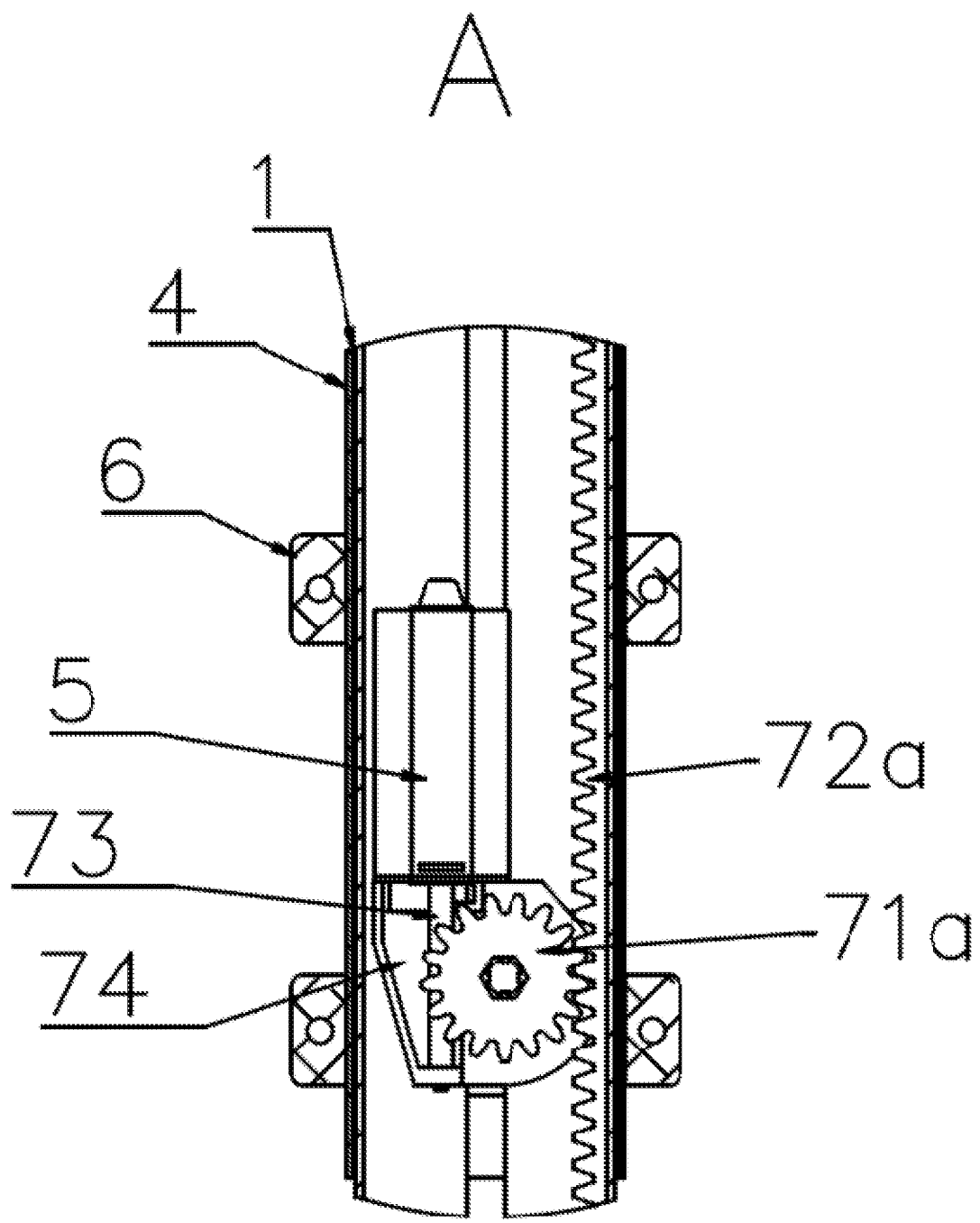
FIG. 6 illustrates an enlarged view of a part of the linear driving device according to the second embodiment of the present disclosure.

In a second embodiment, the linear driving device 7 of the electric shelf as shown in FIGS. 5 and 6 comprises a motor 5, a wheel gear 71a and a rack gear 72a. The rack gear 72a is parallel with the column 1 and is fixed to the inner wall of the column 1. The motor 5 is drivably connected to a worm wheel and the wheel gear 71a by a motor worm 73. The rack gear 72a is engaged with the wheel gear 71a. A motor support 74 is fixed to the motor 5. The motor support 74 is fixed to the motor 5 on one end, and connected to the guide sleeve 4 through the rail groove 11 on the other end. During usage, the motor actuates the guide sleeve 4 to move vertically along the rack gear 72a through the transmission of the worm wheel and the wheel gear 71a.

Figure 7:
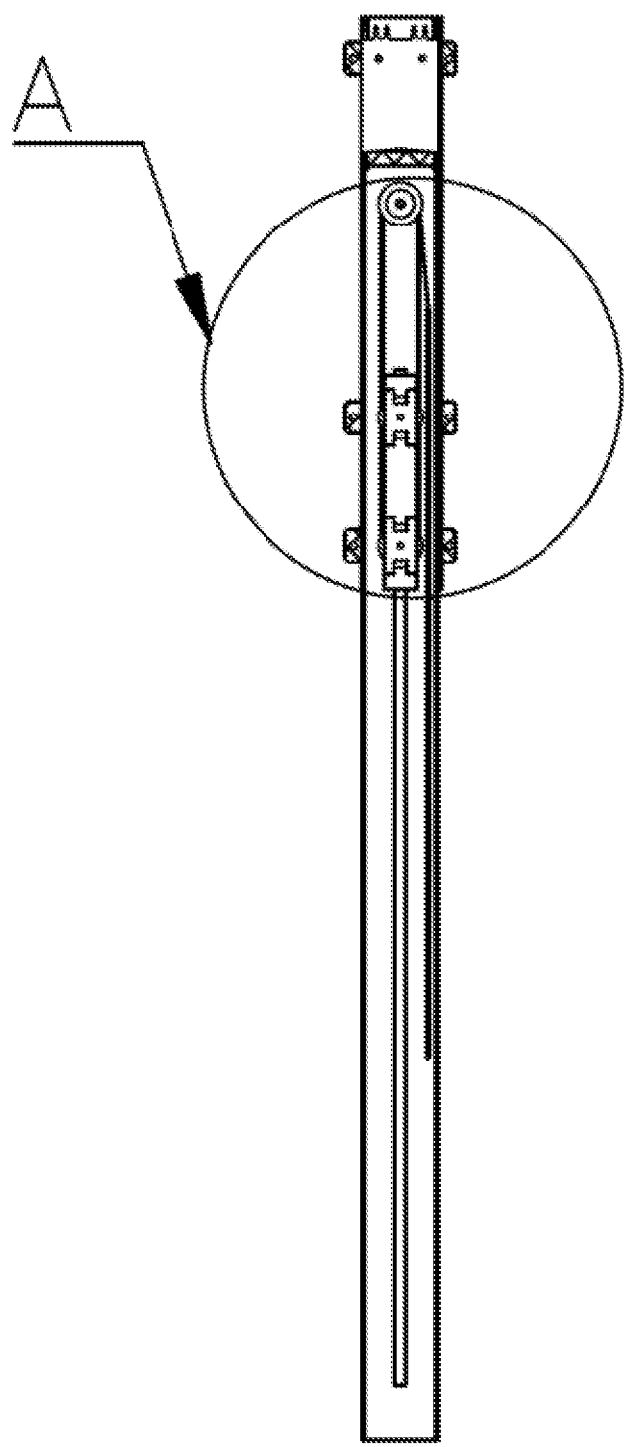
FIG. 7 illustrates a profile of the linear driving device according to the third embodiment of the present disclosure.
Figure 8:
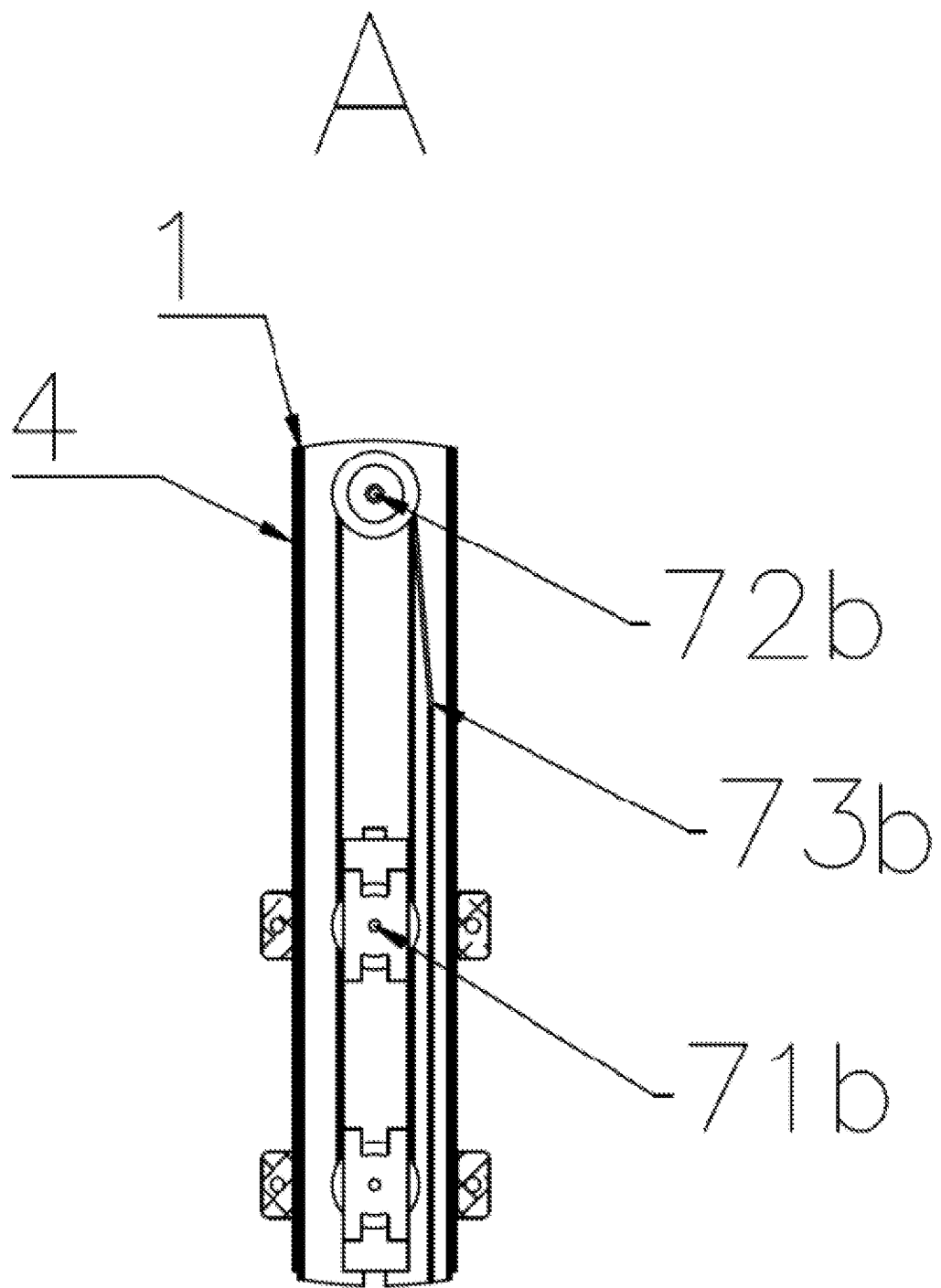
FIG. 8 illustrates an enlarged view of a part of the linear driving device according to the third embodiment of the present disclosure.

In a third embodiment, the linear driving device 7 of the electric shelf as shown in FIGS. 7 and 8 comprises a fixed pulley 72b, a moving pulley 71b, a wire 73b, a wire coiler connected to the wire 73b and a motor 5 drivably connected to the wire 73b. In some embodiments, a plurality of moving pulleys 71b can form a group of moving pulleys. The number of moving pulleys 71b is not limited in this embodiment. A fixing component is connected to the group of moving pulleys. The fixing component is connected to the guide sleeve 4 through the rail groove 11. During usage, the wire 73b is driven by the motor 5 to actuate the group of moving pulleys. The group of moving pulleys enables vertical displacement of the guide sleeve 4 in the rail groove 11.

Figure 9:
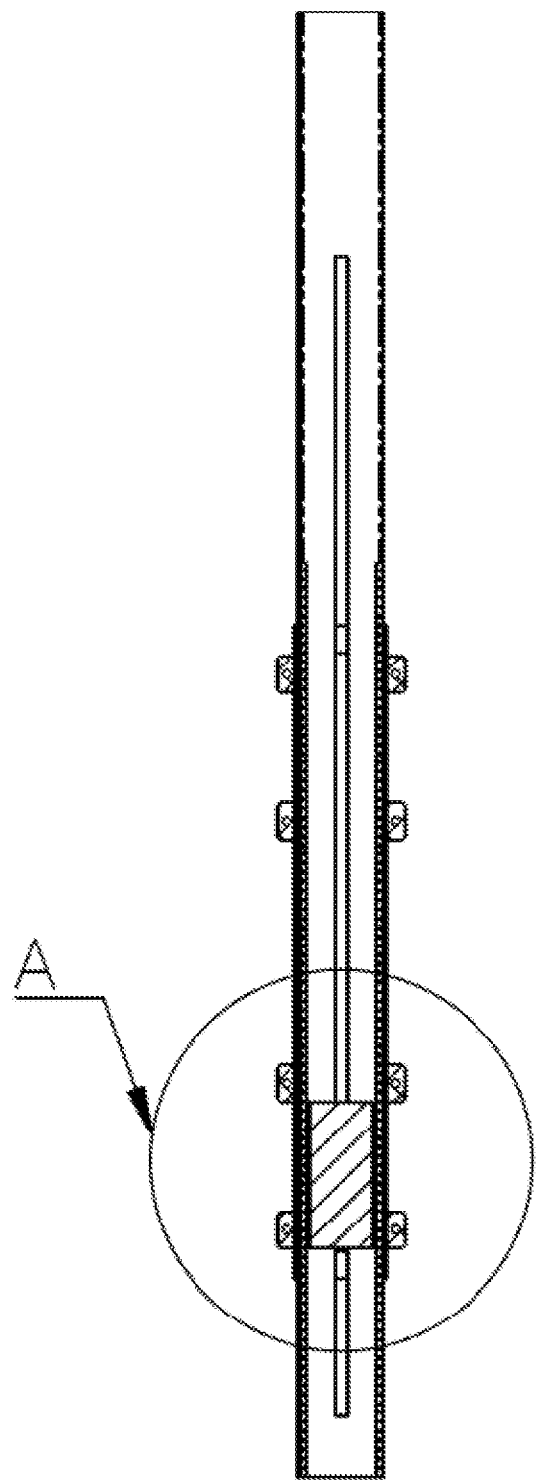
FIG. 9 illustrates a profile of the linear driving device according to the fourth embodiment of the present disclosure.
Figure 10:
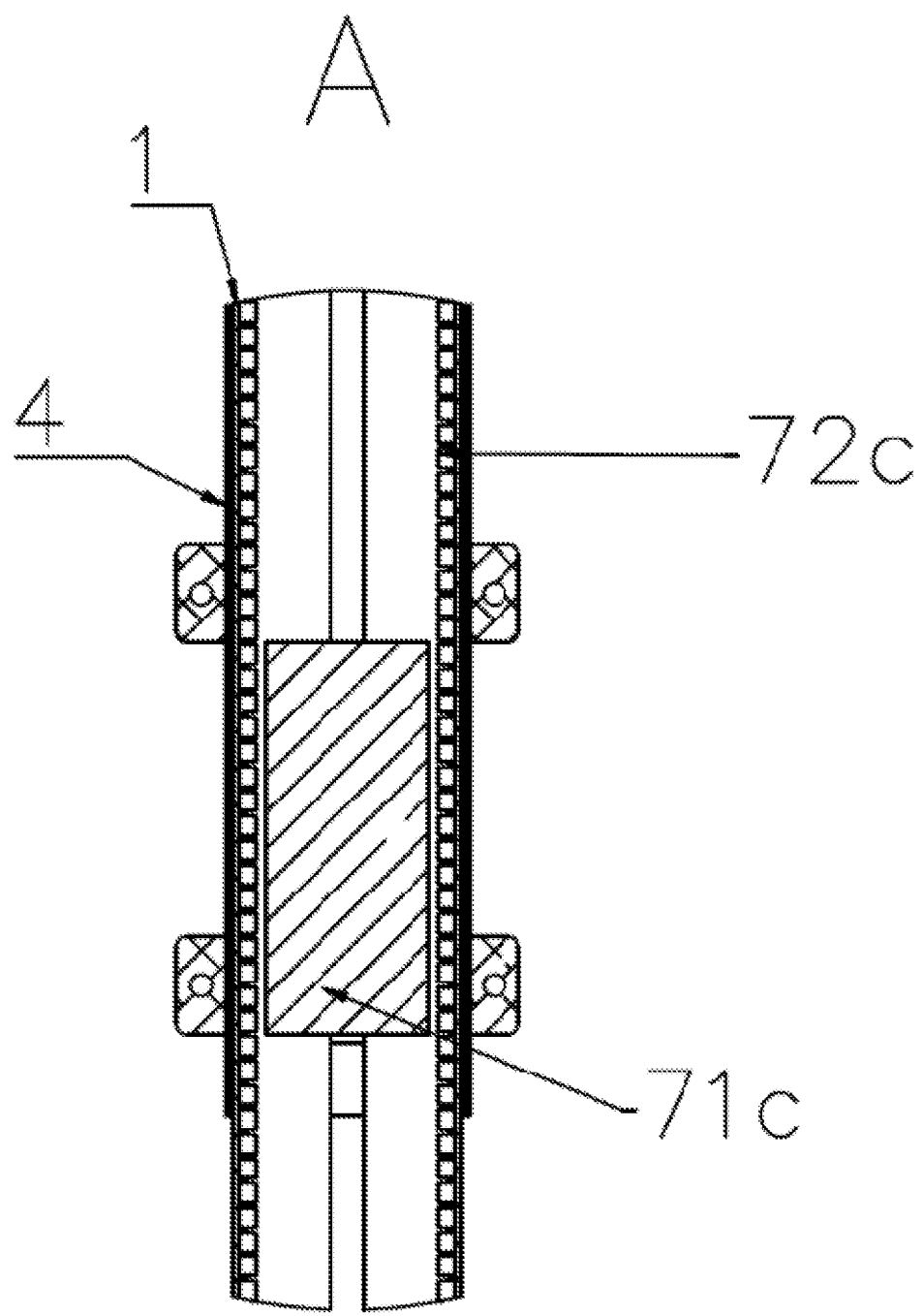
FIG. 10 illustrates an enlarged view of a part of the linear driving device according to the fourth embodiment of the present disclosure.
Figure 11:
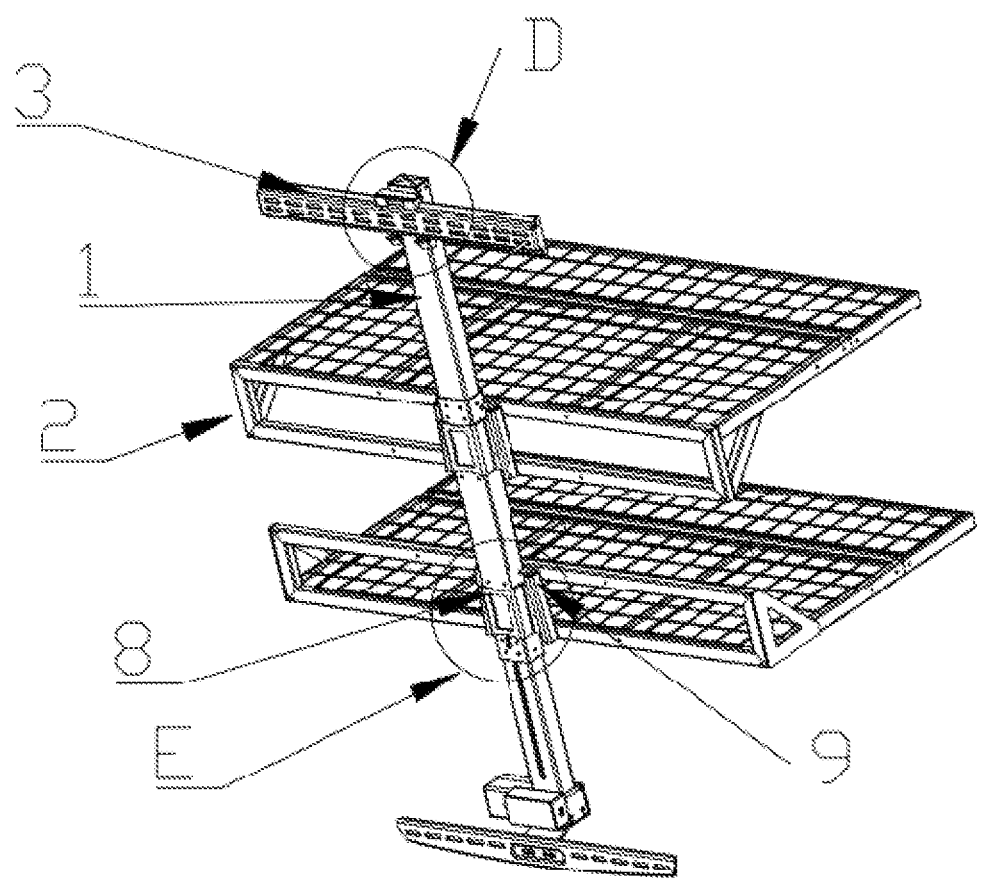
FIG. 11 illustrates the schematic structure of an electric shelf according to an embodiment of the present disclosure.
Figure 12:
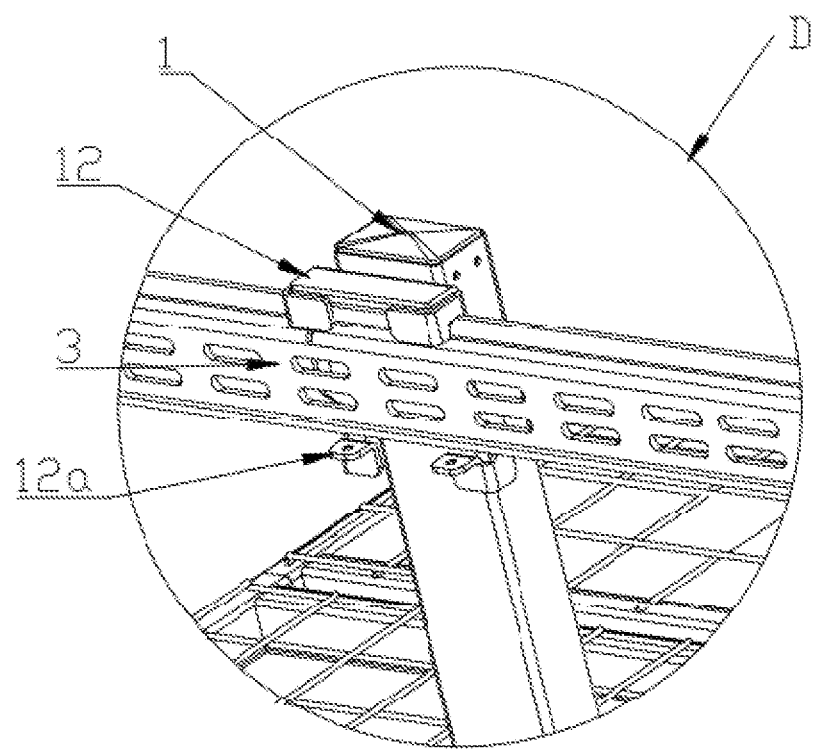
FIG. 12 illustrates an enlarged view of a part D of FIG. 11 according to an embodiment of the present disclosure.

In a fourth embodiment, the linear driving device 7 of the electric shelf as shown in FIGS. 9 and 10 comprises a controllable magnetic guide rail 72c, a magnetic core 71c and an insulating guide sleeve 4. The controllable magnetic guide rail 72c is fixed to and parallel with the column 1. The magnetic core 71c is connected to the guide sleeve 4. The magnetic core 71c actuates the guide sleeve 4 to move along the controllable magnetic guide rail 72. For example, the magnetic core 71c can be enabled to actuate the guide sleeve 4 to move along the controllable magnetic guide rail 72 by changing the magnetism of the controllable magnetic guide rail 72 using a powered electromagnetic linear driving device 7.

Although certain embodiments have been illustrated and described herein for purposes of description, a wide variety of alternate and/or equivalent embodiments or implementations calculated to achieve the same purposes may be substituted for the embodiments shown and described without departing from the scope of present disclosure. This application is intended to cover any adaptations or variations of the embodiments discussed herein. Therefore, it is manifestly intended that embodiments described herein be limited only by the claims and the equivalents thereof.

We claim:

1. An electric shelf, comprising:
   at least one column to be installed on a wall;
   a slidable component arranged on the column to slide along the column vertically;
   at least one layer of shelf board component connected to the slidable component to move simultaneously with the slidable component; and a linear driving device connected to the slidable component and the column to actuate the slidable component to move relative to the column; the column is a hollow cylinder, and the slidable component is sleeved outside the column; a driving end of the linear driving device is arranged within the column.

2. The electric shelf of claim 1, wherein the column comprises one or more mounting boards for mounting onto the wall.

3. The electric shelf of claim 2, wherein the column comprises two mounting boards arranged on an upper part and a lower part of the column, respectively.

4. The electric shelf of claim 1, wherein a rail groove is arranged vertically on the column, and the driving end of the linear driving device is connected to the column through the rail groove.

5. The electric shelf of claim 4, wherein each shelf board component comprises a frame and a board body, a frame connector is arranged between the frame and the exterior tube, the frame connector encircles the exterior tube near a central section of the frame connector, and the two ends of the frame connector are fixed to the frame;
   wherein the slidable component is an exterior tube mounted outside the interior tube.

6. The electric shelf of claim 5, wherein each shelf board component further comprises a reinforcing bar arranged parallel with the frame, a reinforcing bar connector is arranged between the reinforcing bar and the exterior tube, the reinforcing bar connector encircles the exterior tube near a central section of the reinforcing bar connector, and the two ends of the reinforcing bar connector are fixed to the reinforcing bar.

7. The electric shelf of claim 1, wherein one end of the column is provided with a mounting hole, the slidable component is connected with the linear driving device inside the column through the mounting hole.

8. The electric shelf of claim 7, wherein the interior tube is hollow, a driving end of the linear driving device is arranged within the interior tube, a rail groove is arranged vertically on the interior tube, and the driving end of the linear driving device is connected to the exterior tube through the rail groove;

wherein the column is an interior tube fixed to the wall.

9. The electric shelf of claim 1, wherein the linear driving device is connected to the sliding component from the top or the bottom of the column.

10. The electric shelf of claim 1, wherein a sliding rail is arranged vertically on the column, and the slidable component is a slider in connection with the sliding rail to slide along the sliding rail.

11. The electric shelf of claim 1, wherein each shelf board component comprises a frame, a board body and a reinforcing bar arranged parallel with the frame and connected to the slidable component, the slidable component is connected to the frame at a side of the frame which is adjacent to the column, at least two groups of connecting bars are arranged between the reinforcing bar and the frame, each group of connecting bars comprises two connecting bars, and each connecting bar is connected to the reinforcing bar on one end and to the frame on the other end.

12. The electric shelf of claim 11, wherein the electric shelf comprises two layers of shelf board components, and the distance between the two shelf board components is larger than the distance between the two reinforcing bars of the two shelf board components.

13. The electric shelf of claim 1, wherein the linear driving device comprises a motor, a transmission component, a screw rod and a screw rod nut, the screw rod nut is connected to the slidable component or connected to the shelf board component.

14. The electric shelf of claim 13, wherein the screw rod and the screw rod nut of the linear driving device are arranged within the column, a rail groove is arranged vertically on the column, the slidable component is a guide sleeve mounted outside the rail groove, and the screw rod nut is connected to the guide sleeve through the rail groove.

15. The electric shelf of claim 14, wherein a limiter is provided between a top end of the screw rod and the column to avoid drift of the screw rod.

16. The electric shelf of claim 1, wherein the linear driving device comprises a motor, a transmission component, a motor connector, a wheel gear and a rack gear, the wheel gear is engaged with the rack gear, the motor is connected to the wheel gear through the transmission component, the motor actuates the wheel gear to rotate on the rack gear such that the motor moves vertically along the rack gear, the motor is connected to the slidable component through the motor connector, and the rack gear is fixed to and parallel with the column.

17. The electric shelf of claim 1, wherein the linear driving device comprises a motor, a fixed pulley, a moving pulley and a wire, the fixing pulley is fixed to the column, the moving pulley is connected to the slidable component, the wire is connected to the fixed pulley, the moving pulley, and the motor, and the motor actuates the moving pulley to move vertically by pulling the wire.

18. The electric shelf of claim 17, wherein the linear driving device further comprises a wire coiler connected to the wire.

19. The electric shelf of claim 1, wherein the linear driving device comprises a controllable magnetic guide rail, a magnetic core and an insulating slidable component, the controllable magnetic guide rail is fixed to and parallel with the column, the magnetic core is connected to the slidable component, and the magnetic core actuates the slidable component to move along the controllable magnetic guide rail.

20. The electric shelf of claim 1, wherein the shelf board component comprises two parts including a connecting part adjacent to the column and an extending part away from the column, and the connecting part is detachably or rotatably connected to the extending part.

* * * * *